United States Patent [19]

Budraitis

[11] 4,312,241
[45] Jan. 26, 1982

[54] LOAD CELL
[75] Inventor: Tadas Budraitis, Midlothian, Ill.
[73] Assignee: Productronix, Inc., Oak Forest, Ill.
[21] Appl. No.: 54,662
[22] Filed: Jul. 5, 1979
[51] Int. Cl.$^3$ ............................................. G01L 3/10
[52] U.S. Cl. ................................................. 73/862.35
[58] Field of Search .............. 73/1 B, 141 A, DIG. 4, 73/136 B, 136 A, 133 R, 862.35; 310/338

[56] References Cited

U.S. PATENT DOCUMENTS

| | | | |
|---|---|---|---|
| 2,563,425 | 8/1951 | Schaevitz | 73/136 B |
| 3,129,300 | 4/1964 | Moyles | 73/136 B |
| 3,956,930 | 5/1976 | Shoberg | 73/136 B |

FOREIGN PATENT DOCUMENTS 169833  8/1965  U.S.S.R. ............................ 73/136 B

Primary Examiner—Donald O. Woodiel
Attorney, Agent, or Firm—Wegner, Stellman, McCord, Wood & Dalton

[57] ABSTRACT

A load cell for measuring the force developed between reciprocating machine members as in a press or the like. The load cell has a cross-sectional configuration which will deform nonuniformly if subjected to nonuniform loading to distribute the load throughout the cell carrier. In one form the carrier is a hollow cylinder with a piezoelectric transducer secured to the wall. In another form the piezoelectric transducer is carried in a mounting ring supported in a hole through the cylinder wall. In both, the piezoelectric transducer is held under a preload with its axis at right angles to the direction of the machine force so that deformation of the carrier by the machine force reduced the stress on the transducer. An end plate assembly has a spherical ball and socket to accommodate press member misalignment. Another form of the load cell is an elongated member for measuring the load in a press brake. The hollow cylindrical load cell with the transducer mounted at an angle of 45° to the cylinder axis measures torque, as in a rotating shaft. The load cell may use other force transducers, as a resistive strain gauge or a linear variable differential transformer.

4 Claims, 15 Drawing Figures

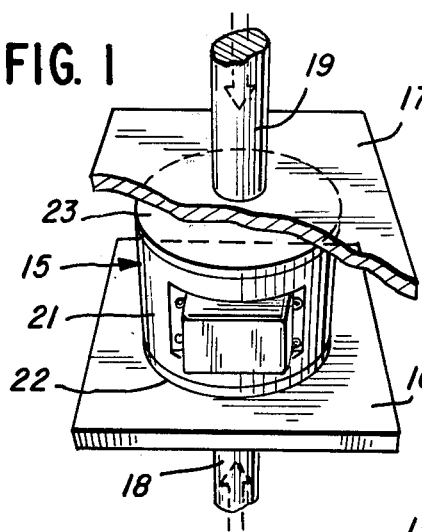
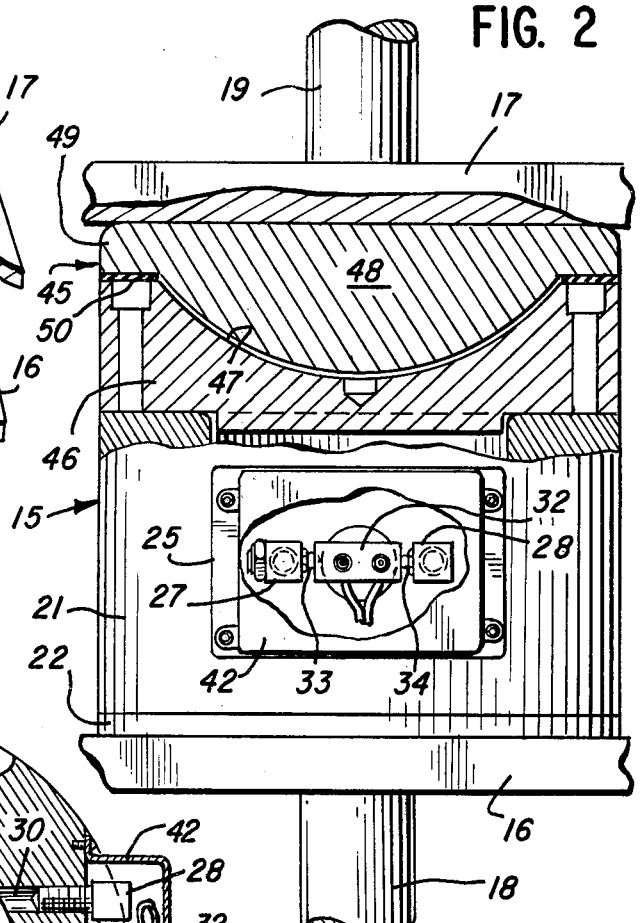
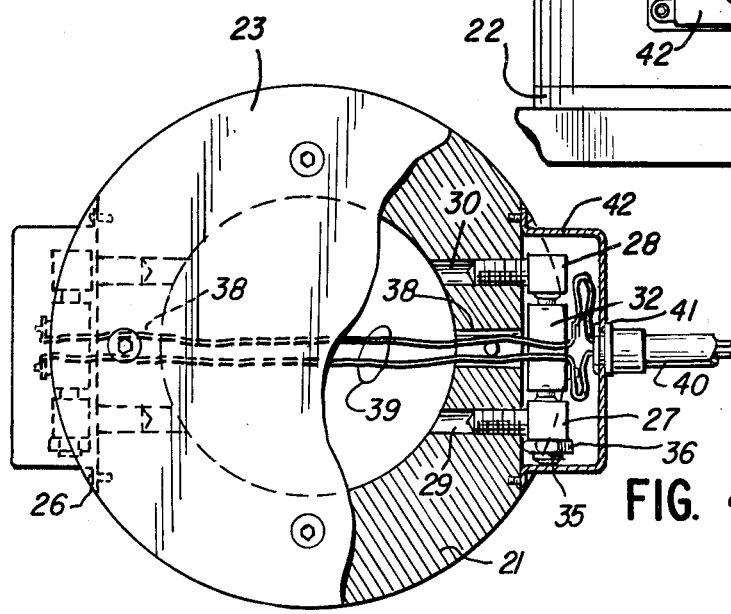
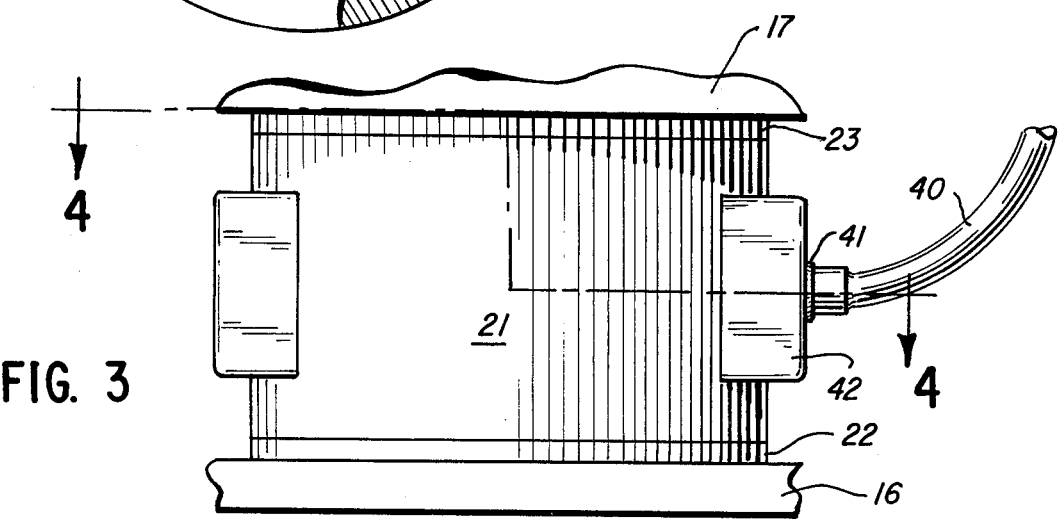

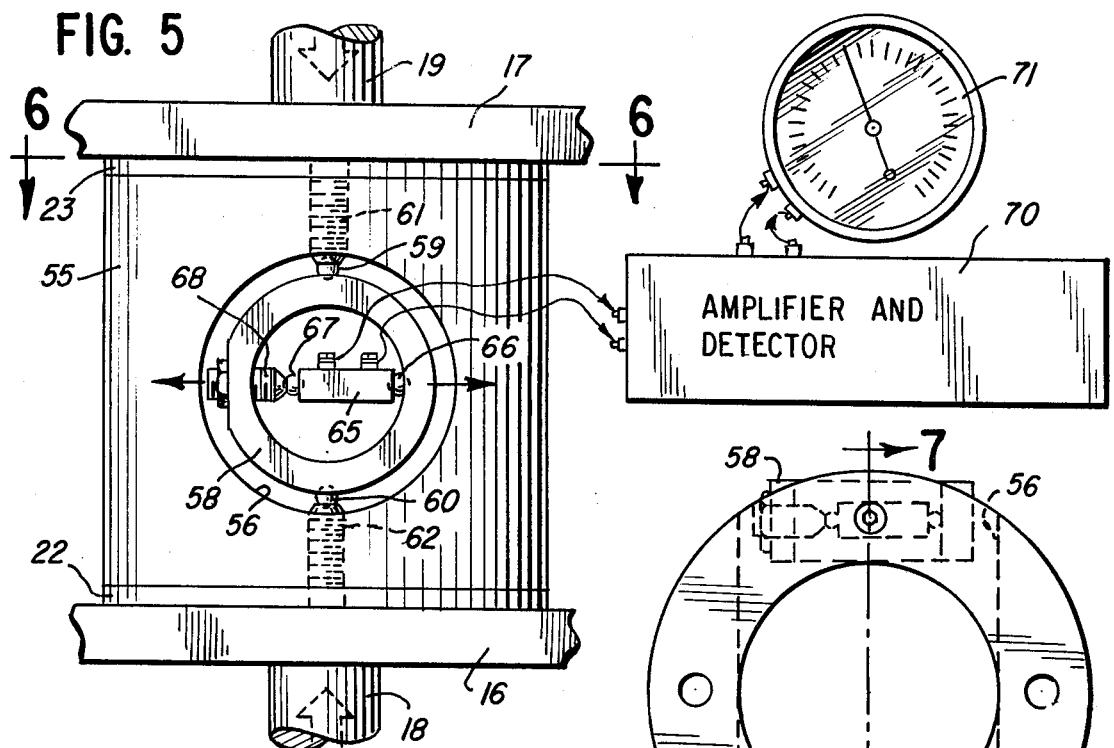
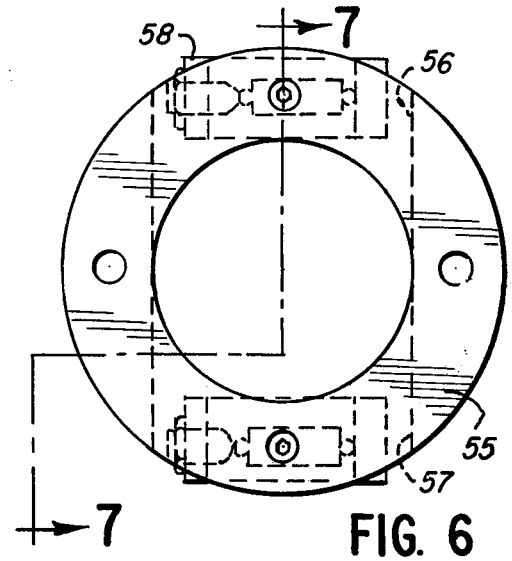
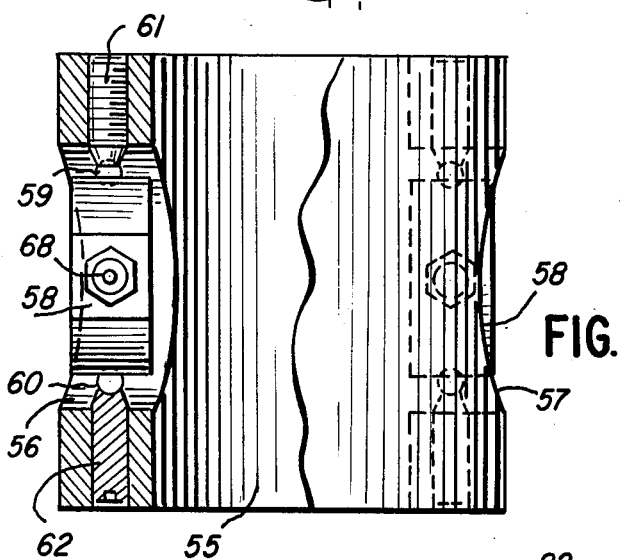
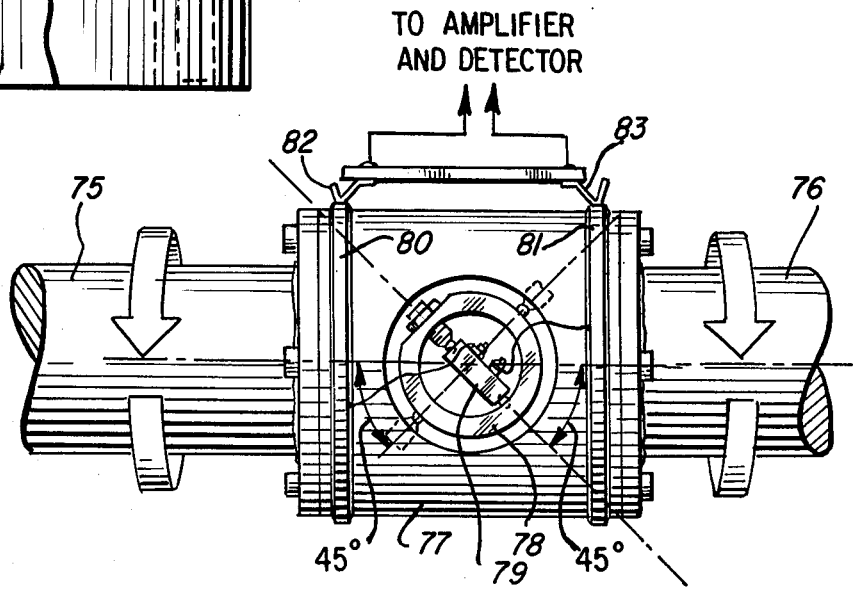

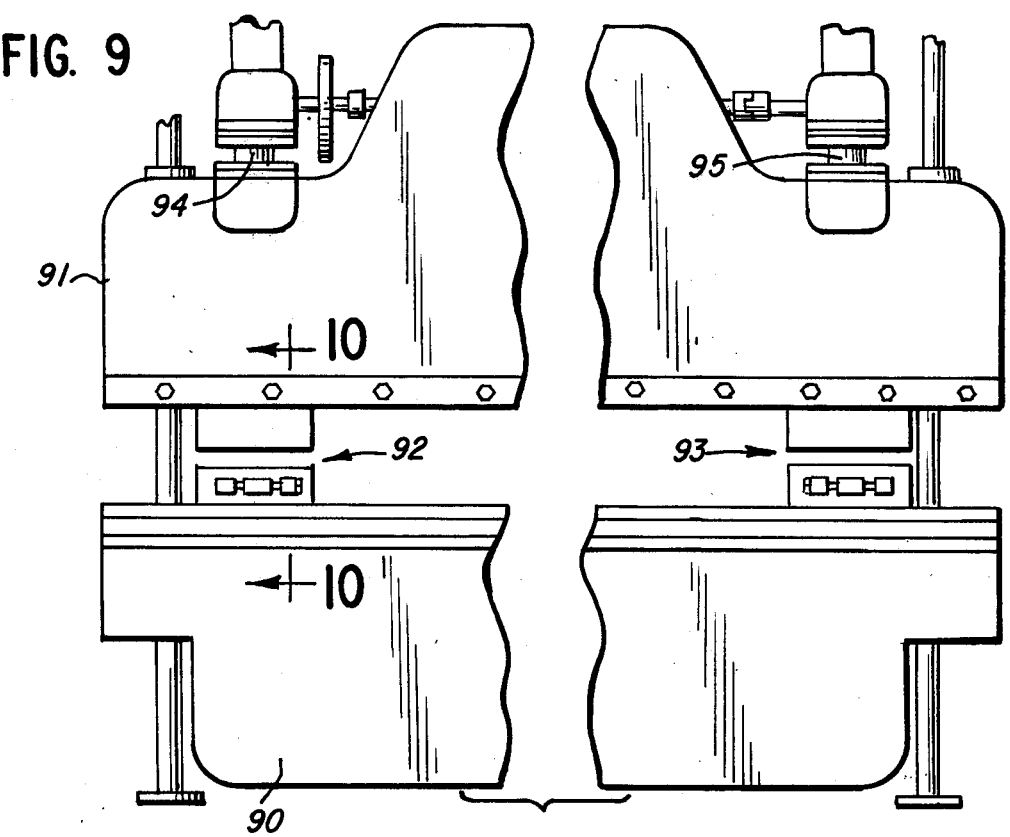
FIG. 9
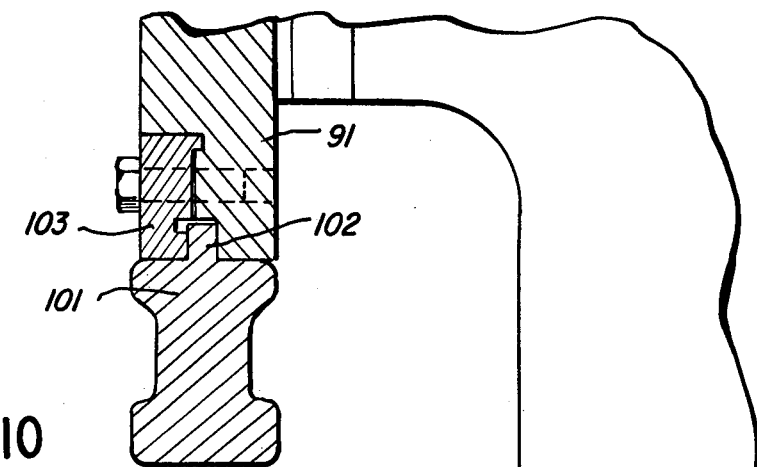
FIG. 10
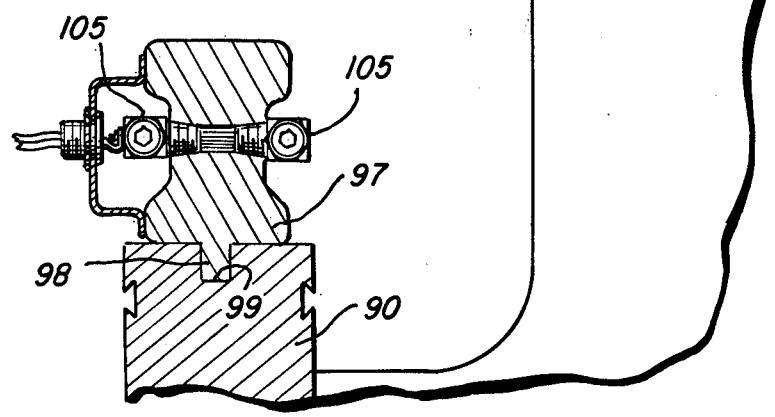

LOAD CELL

This invention relates to a load cell. The load cell may, for example, be used in measuring the force applied during operation of a reciprocating press. Such a measurement is often made in calibration of a machine load monitoring system. In a large press the load cell must have a capacity of several hundred tons.

Prior load cells used in calibrating such machines have typically included a solid cylindrical body fitted with a strain gauge to measure deformation of the body under load. The machine members are often not precisely parallel so that the force is unevenly applied to the body of the load cell. This results in localized deformation of the body and the strain gauge measurement does not accurately reflect the load. Moreover, a solid body acts as a punch and if the spacing of the machine members is less than the length of the load cell body, the machine members may be damaged.

One feature of the load cell of the invention has a cross-section which will deform nonuniformly to accommodate a nonuniform load.

Another feature of the load cell of the invention is that the carrier will fail under an excessive load and the possibility of damage to the machine members is reduced.

In one form the carrier is a hollow cylinder. In another form the carrier is an elongated bar with upper and lower surfaces and an intermediate section which has an area in a plane at right angles to the direction of force to be measured smaller than the area of the upper and lower surfaces.

A further feature of the invention is that the cylindrical carrier has an end piece with a spherical ball and socket to accommodate machine member misalignment.

Yet another feature is that a ring is mounted in a hole in the wall of the carrier along a diameter parallel with the applied load and the transducer is mounted within the ring along a diameter at right angles to the ring mounting diameter. This affords greater sensitivity than the load cell with the transducer mounted on the carrier surface.

Still a further feature is that the load cell with a hollow cylindrical carrier has the transducer mounted at an angle on the surface thereof to measure torque, as in a rotating shaft.

Further advantages of the invention will readily be apparent from the following specification and from the drawings, in which:

FIG. 1 is a diagrammatic perspective of a load cell between two machine members;

FIG. 2 is an elevation, partially in section, of a modified form of the load cell of FIG. 1;

FIG. 3 is en elevation of the load cell of FIG. 1 taken at right angles to the elevation in FIG. 2;

FIG. 4 is a broken section of the load cell taken along line 4—4 of FIG. 3;

FIG. 5 is an elevation of a modified load cell with a load indicating circuit shown in block form;

FIG. 6 is a plan view of the load cell of FIG. 5 with a carrier cover broken away;

FIG. 7 is a broken elevation of the load cell taken at right angles to the view of FIG. 5;

FIG. 8 is an elevation of a modified load cell for measuring torque;

FIG. 9 is a fragmentary elevation of a press brake with a load cell therefor;

FIG. 10 is a section along line 10—10 of FIG. 9;

Figure 11:
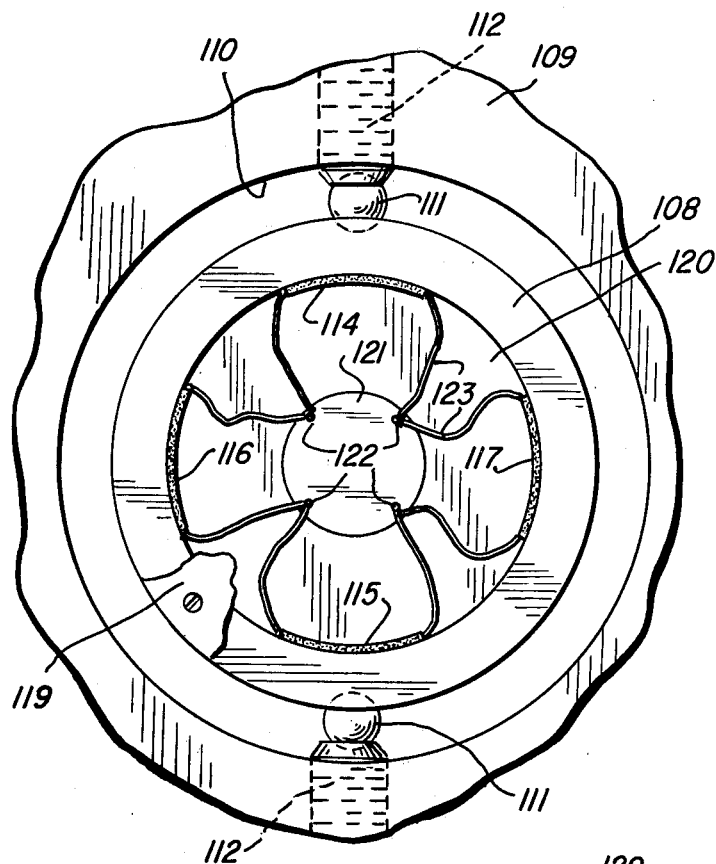
FIG. 11 is an elevation of a load cell transducer mounting ring with strain gauge transducers.

In FIGS. 1-4 load cell 15 is located between machine members 16 and 17 which are illustrated as plates mounted on actuating rods 18 and 19. The machine in which the load is measured may, for example, be a reciprocating press used for stamping or cutting. Lower machine member 16 is typically a fixed bed while upper machine member 17 may be a reciprocating ram or tool carrier. One or more load cells 15 may be placed between the machine members and the machine operated to determine the force which is applied. This measurement is required, for example, in the calibration of a protective overload sensing system for the machine.

In accordance with the invention, load cell 15 has a hollow cylindrical carrier 21 with end plates 22, 23 secured thereto. Parallel, diametrically related flat surfaces 25 and 26 are located on the outer walls of carrier 21 intermediate the upper and lower surfaces thereof. Transducers are mounted on the flat surfaces to measure the deformation of the carrier which is directly related to the machine force applied thereto. A piezoelectric transducer is preferred and is illustrated. The piezoelectric transducer mountings may be identical and only one is shown and described in detail, FIGS. 2 and 4. A pair of mounting brackets 27, 28 are threaded into tapped holes 29, 30 in the wall of carrier 21. Piezoelectric transducer element 32 is supported between brackets 27, 28 by a pair of balls 33, 34. One of the balls is seated on screw 35 which is adjusted to preload the transducer 32. Jam nut 36 is tightened after the preload is set. Further details of the transducer mounting brackets may be found in Budraitis U.S. Pat. No. 3,858,440.

Transducer mounting brackets 27, 28 are aligned on the surface of carrier 21 at right angles to the carrier axis along which the machine load is applied. Thus, as the load cell is subjected to the force of the machine and compressed axially, it expands in the direction of the sensitive axis of transducer 32 so that the force on the transducer is reduced. The preload on the transducer is selected to be greater than the lateral expansion which will occur with maximum machine loading. In this manner the transducer is not subjected to an excessive force in the event of a machine overload.

Holes 38 through the carrier wall immediately inside transducer 32 and its diametric counterpart accommodate signal wires 39 which interconnect the two transducers. A signal cable 40 is connected with a fitting 41 on transducer cover 42 for transmitting the transducer signals to an amplifier and detector.

The hollow cylindrical carrier has two principal advantages over the solid element load cells which have been used in the past. The first is in the measurement of an uneven load. It is unlikely in any practical system that machine elements 16, 17 and the faces of end members 22, 23 will all be parallel. Accordingly, the force of the machine on the load cell is not uniformly distributed across the cell. The hollow annular configuration of the carrier 21 will deform nonuniformly when subjected to a nonuniform load so that excessive local loading of the machine is minimized. Second, the hollow cylindrical carrier has a substantially greater end area than a solid member of the same cross section. This distributes the force on the machine surfaces and in the event of an overload condition the wall of the carrier will fail rather than damaging the machine elements.

The load cell or cells should be symmetrically arranged between the machine members 16, 17 with respect to the machine member actuators 18, 19. FIG. 1 where there are single machine member actuators and a single load cell, the load cell is aligned with the actuators. If the reciprocating element of the machine were actuated by two members, and a single load cell used, it should be located half-way between the two actuators. Similarly, if there are four actuators and a single load cell, the cell should be located at the intersection of the diagonals drawn between opposite actuators. The number of load cells used depends on the load capacity of the individual load cells and the load to be established on the machine.

The spacing between the machine elements must be properly correlated with the height of the load cell to establish the desired load. Either the machine elements may be adjusted to change the spacing at the bottom of the stroke of the reciprocating member or shims may be placed between the load cell and machine member to increase its effective height. Shims must be larger than the end surfaces of the load cell to avoid excessive local loads on the cell and machine. Operation of the machine should start at a low load level and be increased gradually by reducing element spacing or adding shims or both.

FIG. 2 illustrates a modified form of the load cell in which the upper end plate 23 is replaced with a self-adjusting assembly 45. Base member 46 is secured to the end of hollow cylindrical carrier 21 and has a spherical socket 47 which receives the spherical ball portion 48 of a head 49 which in turn has a surface for engagement with machine member 17. Base 46 and head 49 have planar peripheral surfaces around the spherical joint with a resilient gasket 50 interposed therebetween to accommodate angular movement of the head 49 conforming with misalignment of the machine members 16 and 17. The surfaces of socket 47 and ball 48 are preferably provided with a suitable high pressure lubricant.

Another form of load cell is shown in FIGS. 5, 6 and 7. Here hollow cylindrical carrier 55 has diametric holes 56, 57 through the wall thereof. Again, two similar transducers are used and one will be described in detail. A mounting ring 58 is supported in hole 56 between a pair of balls 59, 60 along a diameter parallel with the carrier axis and thus parallel with the direction of the force applied by the machine. Balls 59, 60 are backed by screws 61, 62 which extend in an axial direction through the carrier wall. Transducer 65 is mounted within ring 58 on a diameter at right angles to the diameter on which the ring is supported, between balls 66, 67. Adjustment screw 68 establishes the preload on transducer 65. As in the load cell of FIGS. 1–4, the application of an axial force to cylindrical carrier 55 causes compressive deformation of mounting ring 58 along the diameter between balls 59 and 60 with a corresponding elongation of the diameter on which the transducer is mounted, reducing the force applied to the transducer.

The signal from transducer 65 is connected with an amplifier and detector indicated in block form at 70 and the dynamic output signal may be displayed on meter 71. Preferably the load display incorporates a peak signal holding circuit so that meter 71 maintains an indication of the maximum load experienced by the load cell during cycling of the machine.

Plural transducers may be connected either in parallel or in series and the output signal is effectively a composite or average of all of the signals. If the level of signal of each transducer is relatively low, the transducers may be connected in series to minimize the signal amplification necessary. If the signal level is high, the transducer outputs should be connected in parallel.

FIG. 8 illustrates a modification of the load cell of FIGS. 5–7 utilized to measure the torque transmitted through shafts 75, 76. Cylindrical carrier 77 is coupled between the two shafts. The transducer mounting ring 78 is oriented with its mounting axis along the compressive shear plane substantially at 45° with respect to the carrier axis. Transducer 79 is located within the ring on a diameter at right angles to the ring mounting axis and thus is unloaded as the torque transmitted through the shafts 75, 76 increases. The transducer signal is connected with slip rings 80, 81 and through fixed wipers 82, 83 with a suitable signal processing and display circuit (not shown). As in the other load cell forms, one or a plurality of piezoelectric transducers may be used.

FIGS. 9 and 10 show a load cell for a press brake which has an elongated bed 90, an elongated reciprocating ram 91. Two load cell assemblies 92 and 93 are located in general alignment with ram actuators 94, 95. The two load cell assemblies are the same and only one will be described.

Load cell carrier 97 is an elongated member having a lower surface resting on the bed 90 of the press brake with a rib 98 received in groove 99 of the bed. A dummy carrier 101 is mounted on the press brake ram 91 with a rib 102 held to the ram by clamping plate 103. Carriers 97 and 101 have upper and lower surfaces which engage the respective press brake members and each other for the transmission of the press brake force. The carriers have a cross-sectional dimension intermediate their upper and lower surfaces and at right angles to the longitudinal extent of the carrier which is less than the area of the upper and lower surfaces. This provides for a nonuniform deformation in response to a load which is nonuniformly distributed in the upper and lower surfaces to minimize localized stresses in the carriers. Two piezoelectric transducers 105 are mounted on opposite faces of the intermediate portion of carrier 97. The sensing axis of each transducer is in a plane at right angles to the load applied to the carrier by operation of the press brake. The transducers are preloaded and the stress thereon reduced by the load imposed on the carrier. As in the previously described load cell systems, the outputs of the piezoelectric transducers are connected with suitable detecting and display circuitry.

Although the piezoelectric transducer illustrated and discussed above is preferred, the load cell may utilize other transducers which will measure mechanical deformation. In FIG. 11 a transducer mounting ring 108, similar to ring 58 of FIGS. 5–8, is illustrated with resistive strain gauge transducers. Load cell carrier 109 has a hole 110 in the wall thereof. Mounting ring 108 is supported between balls 111 held by screws 112 along an axis parallel with the load to be measured. Four strain gauges are mounted 90° apart on the inner surface of mounting ring 108. Strain gauges 114 and 115 are aligned on the diameter of support balls 111. Strain gauges 116 and 117 are on a diameter at right angles thereto. When the load cell is subjected to a compressive load, mounting ring 108 is compressed between balls 111 and tends to flatten. Strain gauges 114, 115 are extended and their resistance increases. Strain gauges 116, 117 are bent and their resistance decreases.

Figure 12:
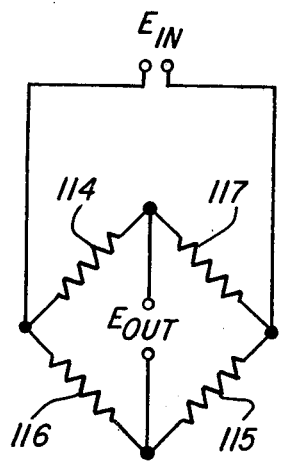
FIG. 12 is a circuit for the strain gauge transducers of FIG. 11.

The four strain gauges are preferably connected in a bridge circuit as shown in FIG. 12 with the diametrically opposed strain gauges on opposite sides of the bridge. An input electrical signal $E_{in}$ is connected across one pair of opposite terminals and an output $E_{out}$ which represents the load being measured is obtained across the opposite pair of terminals.

Mounting ring 108 has cover plates 119, 120 on either side thereof. The plate 119 is broken away to expose the strain gauges. An electrical connector 121 mounted in the center of cover plate 120 has electrical terminals 122 connected to the strain gauges by wires 123. A cable (not shown) may extend from the connector 121 to a remote power supply and indicator or measuring circuit. Ring 108 and strain gauges 114–117 may be utilized in the torque measurement assembly of FIG. 8 or in the press brake of FIGS. 9 and 10.

Figure 13:
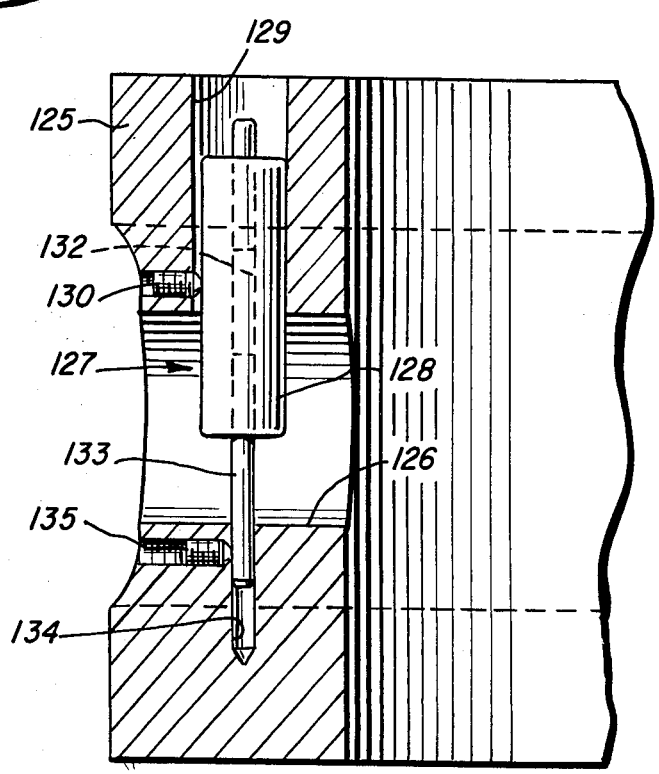
FIG. 13 is a longitudinal section through a wall of a load cell carrier with a linear variable differential transformer transducer.

A load cell utilizing a linear variable differential transformer (LVDT) is illustrated in FIG. 13. A carrier 125, as the cylindrical member of FIG. 5, has a hole 126 through the wall thereof. Linear variable differential transformer 127 has a body 128 with the transformer coils. The body is secured in an axially extending bore 129 by a set screw 130. A core member 132 of magnetically conductive material is mounted on a shaft 133 secured in a bore 134 at the opposite side of hole 126 by a set screw 135. Shaft 133 extends through transformer body 128 with the core 132 positioned within the body. Upon deformation of carrier 125, as under a compressive load, core 132 moves with respect to the windings in body 128 providing an output from the LVDT which represents the load applied to the carrier.

Figure 14:
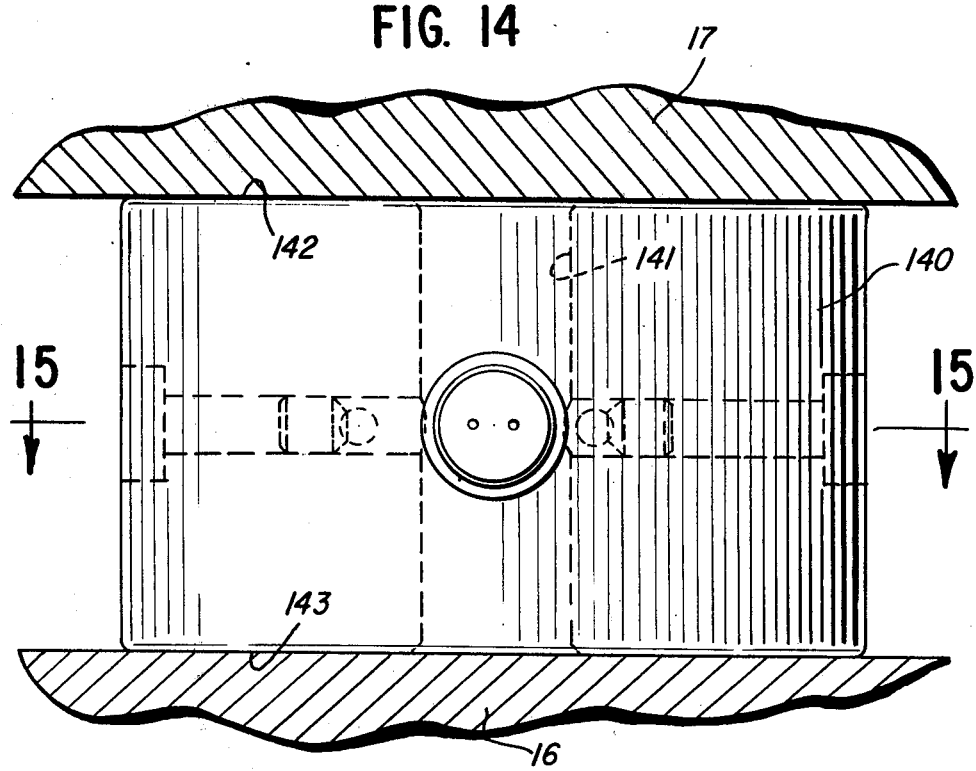
FIG. 14 is an elevation of a modified load cell with the transducer mounted inside the carrier.
Figure 15:
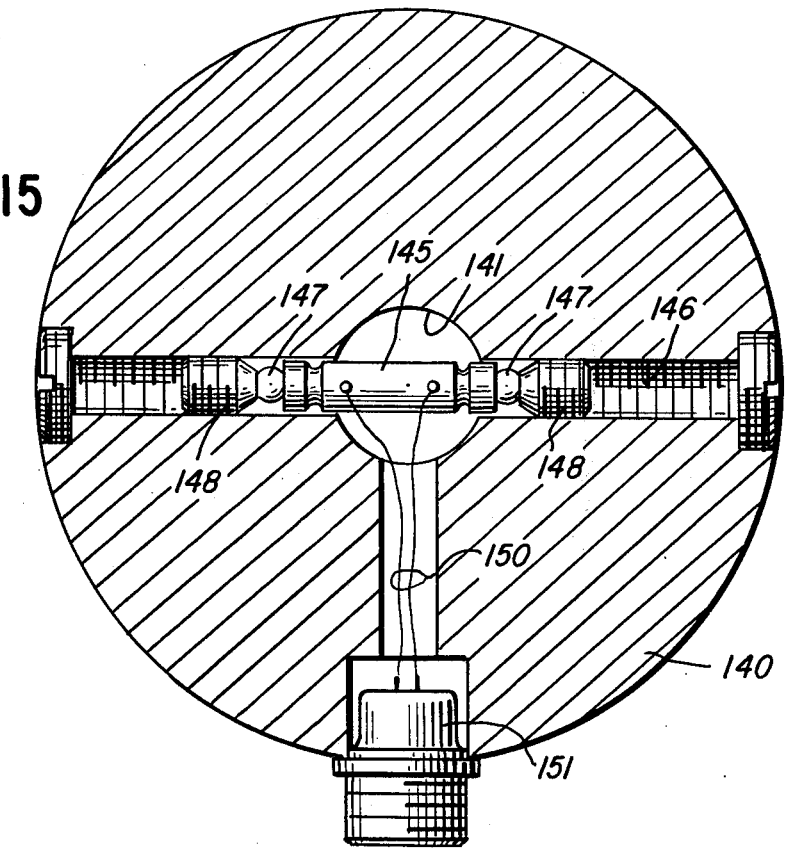
FIG. 15 is a transverse section along line 15—15 of FIG. 14.

Another embodiment of the load cell is illustrated in FIGS. 14 and 15. Cylindrical carrier 140 has an axial bore 141 which allows the carrier to accommodate an uneven load applied to end surfaces 142, 143. Piezo transducer 145 is mounted in a diametric bore 146. The transducer is supported between insulating balls 147 held by screws 148. A preload is applied to the transducer by adjustment of one or both of the screws 148 and the pressure on the transducer is reduced when the cell is subjected to a force applied to the end surfaces.

The terminals of transducer 145 are connected through leads 150 with a socket 151. A cable (not shown) connects the transducer with a reload circuit or instrument. The location of the transducer inside carrier 140 provides protection from accidental damage.

I claim:

1. A load cell to be coupled between two shafts for measuring the torque transmitted between said two shafts, comprising:
    a hollow cylindrical carrier having ends for connection with said shafts, the material of said carrier having a shear angle; and
    means for measuring deformation of said cylindrical carrier along a plane at the shear angle of the carrier material indicative of the torque transmitted between said shafts.

2. The load cell of claim 1 in which said cylindrical carrier has a hole through the wall thereof, and includes:
    a mounting ring supported within said hole on a diameter at right angles to the shear angle of the carrier material; and
    said means for measuring deformation in the carrier includes a piezoelectric transducer supported within said mounting ring to measure ring deformation on a diameter at right angles to the diameter on which the ring is supported.

3. The load cell of claim 2 in which said mounting ring is supported from said carrier between a pair of balls and said piezoelectric transducer is supported from said mounting ring between a second pair of balls.

4. The load cell of claim 1 in which said deformation measuring means includes:
    a transducer having terminals connected with slip rings on said cylindrical carrier; and
    wipers operably connected with said slip rings for electrical connection to the transducer.

* * * * *